US009108786B2

(12) United States Patent
Kohlgrüber

(10) Patent No.: US 9,108,786 B2
(45) Date of Patent: Aug. 18, 2015

(54) TRANSPORT DEVICE AND TRANSPORT MEANS THEREWITH

(75) Inventor: Sven Kohlgrüber, Mörfelden-Waldorf (DE)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 13/879,218

(22) PCT Filed: Oct. 6, 2011

(86) PCT No.: PCT/EP2011/067469
§ 371 (c)(1),
(2), (4) Date: Apr. 12, 2013

(87) PCT Pub. No.: WO2012/049067
PCT Pub. Date: Apr. 19, 2012

(65) Prior Publication Data
US 2013/0213913 A1    Aug. 22, 2013

(30) Foreign Application Priority Data

Oct. 15, 2010  (EP) ..................................... 10187699

(51) Int. Cl.
*B65D 88/12* (2006.01)
*B60P 3/08* (2006.01)
*B65D 85/68* (2006.01)

(52) U.S. Cl.
CPC ................ *B65D 88/129* (2013.01); *B60P 3/08* (2013.01); *B65D 85/68* (2013.01); *B65D 2585/6867* (2013.01)

(58) Field of Classification Search
CPC ..................... B61D 47/005; B65G 2201/0294; B65D 2585/6867; B65D 85/68; B65D 88/129; B65D 88/546; B65D 90/18

USPC .............. 410/24, 26, 4, 13, 28, 29.1; 414/498
See application file for complete search history.

(56) References Cited

U.S. PATENT DOCUMENTS 4,730,562 A  *  3/1988  Baker et al. ................... 105/407
5,213,458 A       5/1993  Preller et al.
(Continued)

FOREIGN PATENT DOCUMENTS

WO   WO 97/05349 A1     2/1997
WO   WO 2005/100087 A1  10/2005

OTHER PUBLICATIONS

International Search Report for PCT/EP2011/067469, dated Oct. 6, 2011 (English translation).
(Continued)

*Primary Examiner* — Glenn Dayoan
*Assistant Examiner* — Sunsurraye Westbrook
(74) *Attorney, Agent, or Firm* — International IP Law Group, PLLC

(57) ABSTRACT

A device for the transportation of vehicles, at a prescribed maximum height of the system, transports an increased possible number of vehicles on a given surface area. The device is suitable for transportation by air, sea, and land. In this context, the vehicles are not unloaded from the device, even in the case of combined land, sea, or air transportation. The device consists of a lower pallet and an upper pallet. The upper pallet is supported on booms which, in turn, rest on the lower pallet. The booms are individually height-adjustable so that the upper pallet can be tilted relative to the lower pallet in the longitudinal direction. At the second end, there is a support element on which the device can be moved in the lengthwise direction, at least if it has been slightly lifted at the opposite first end.

12 Claims, 5 Drawing Sheets

(56) References Cited

U.S. PATENT DOCUMENTS

| | | |
|---|---|---|
| 5,344,266 A | 9/1994 | Kolb |
| 5,427,485 A * | 6/1995 | Henderson et al. ............ 410/26 |
| 5,489,171 A * | 2/1996 | Claps et al. .................... 410/26 |
| 5,890,855 A | 4/1999 | Claps |
| 6,694,894 B1 | 2/2004 | Darnell |

OTHER PUBLICATIONS

International Preliminary Report on Patentability for PCT/EP2011/067469, dated Jan. 3, 2013 (German).

PCT International Preliminary Report on Patentability, dated Jan. 6, 2011, for PCT/EP2011/067469, Filed Oct. 6, 2011 (English Translation).

* cited by examiner

TRANSPORT DEVICE AND TRANSPORT MEANS THEREWITH

CROSS-REFERENCE TO RELATED APPLICATIONS

Pursuant to 35 U.S.C. §371, this application is the United States National Stage Application of International Patent Application No. PCT/EP2011/07469, filed on Jun. 10, 2011, the contents of which are incorporated by reference as if set forth in their entirety herein, which claims priority to European (EP) Patent Application No. 10187699.3, filed Oct. 15, 2010, the contents of which are incorporated by reference as if set forth in their entirety herein.

BACKGROUND

U.S. Pat. No. 5,890,855 describes a device for the transportation of at least two vehicles one above the other, consisting of a lower pallet and an upper pallet, a front pair of columns and a rear pair of columns that are attached to the lower pallet by clamps and that serve to fasten the upper pallet. It is possible to change the inclination of the upper pallet relative to the lower pallet by adjusting the corresponding columns. Moreover, the device can be taken apart in order to allow a space-saving transportation of the empty device. For this purpose, the upper pallet is disassembled from the columns, the columns are disassembled from the lower pallet and laid onto the lower pallet, and the upper pallet is laid onto the columns that are lying on the lower pallet. In order to load two vehicles in the device, first the upper pallet is raised at an angle from one of the ends and secured so that the first vehicle can be driven onto it. Accordingly, the upper pallet is lifted by of an industrial floor truck and secured at a height that depends on the height of the second vehicle, and at a certain angle that, depends on the shape and height of the vehicles, before the second vehicle can be driven onto it. Before the second vehicle is loaded, the height of the upper pallet is determined. Also, how inclined the upper pallet is in order for the second vehicle to fit in the device without being damaged. This loading procedure is laborious. Moreover, even though the construction is stable, it contains many parts, particularly the cross braces for the columns, which make the device heavy. For this reason, this device is not suitable for transportation by airfreight.

Nowadays, vehicles, particularly motor vehicles, are transported in large numbers, at times over long distances. In this process, the vehicles are protected against damage. This may be the case when the vehicles are valuable, for instance, race cars, old-timers, prototypes, exhibition vehicles or other rare automobiles. More and more often, such vehicles are being transported by airfreight, whereby the airline company charges the commissioning party on the basis of the transportation surface area at a given maximum height of the freight. When such vehicles are transported by ship or road, they are often transported in containers, so that they can be protected against damage and so as to reduce the loading work. The height of such containers is also limited. If the vehicles are transported by combined transportation modalities, for example, by train to the harbor or airport, from where they then travel by ship or airplane, they are normally moved by their own driving power onto and off of the transportation trailer and are subsequently driven to a transshipment site. From there, they are usually driven onto airplane pallets in the case of airfreight operations. For sea freight operations, they are either driven into the above-mentioned containers or else into roll-on/roll-off (RORO) vessels. The numerous engine starts used for this purpose and the subsequent short running times are undesired.

Containers of the above-mentioned type are known and standardized, for example, in ISO 668. These are so-called sea freight containers, available as 10-foot, 16-foot, 20-foot and 40-foot containers, which are suitable and used, for instance, for the transportation of motor vehicles. Such containers have a very sturdy construction which, however, translates into a high intrinsic weight. For this reason, such containers are not suitable for airfreight transportation.

P.C.T. Publication WO 96/26849 discloses a device for the transportation of motor vehicles that allows the motor vehicles to be transported one above the other, whereby the upper vehicles can be arranged at an angle above the lower vehicles. This makes it possible to minimize the total height of two motor vehicles that are to be transported one above the other. For this purpose, the device includes height-adjustable wheel carriers on which the wheels of the upper vehicle come to rest. Two of these wheel carriers are needed for each vehicle. The device has a removable or height-adjustable upper frame. The wheel carriers can be moved in a rail system axially with respect to the vehicle axle, so that they can be adjusted to different wheelbases of the vehicle to be transported, and the upper vehicles can be positioned beyond the lower vehicles so that individual vehicle axles can subsequently be lowered and the upper vehicles can be placed at an angle so that the recesses in the car body of the lower vehicles can be utilized, for example, for the trunk or above the engine hood, thus minimizing the total height of the two vehicles that are to be transported above each other. The system is permanently installed on a vehicle for the transportation of vehicles. Due to its intrinsic weight, it is not suitable for airfreight. If the transportation modality—rail, road, ship, aircraft—changes, the vehicles have to be unloaded and subsequently loaded onto the other transportation, in other words, the vehicles themselves have to be moved.

A similar system is disclosed in European patent application EP 0 274 882 A1. A system that is permanently installed on a truck trailer can lift vehicles onto wheel carriers that can be affixed at different heights and that themselves can be axially moved along the length of the trailer in the direction of the vehicle axis. This device entails the same drawbacks as the one mentioned above.

P.C.T. Publication WO 888/05001 proposes an intermodal container in which two vehicles can be transported above each other, whereby rails are affixed on the lengthwise sides of the inner walls of the container and wheel carriers run in these rails. The front and rear axles of a vehicle can stand in the wheel carriers at different heights, as a result of which the vehicle can likewise be placed at an angle, so that the recesses in the car body of the lower vehicles can be utilized for example, for the trunk or above the engine hood, thus minimizing the total height of the two vehicles that are to be transported above each other. Even though this system allows intermodal use, it is not useful at least for airfreight because of its intrinsic weight.

All of the devices known from the state of the art also have the disadvantage that they use the same transportation volume regardless of whether they are loaded or not.

SUMMARY

The subject innovation relates to a device for the transportation of vehicles, whereby, at a prescribed maximum height of the system, the largest possible number of vehicles are to be transported on a given surface area. Accordingly, embodiments include a device, for the transportation of vehicles, that is suitable for transportation by air, sea, and land, and that minimizes the height of two vehicles that are to be transported above each other. Further, the vehicles may remain within the device, even in the case of combined land, sea, and air transportation.

The device contains a lower pallet and an upper pallet. The upper pallet is supported on booms which rest on the lower pallet. The booms have individually height-adjustable lifting rods so that the upper pallet can be tilted relative to the lower pallet in the longitudinal direction. Two vehicles can be arranged above each other in such a way that, when the upper pallet is tilted, the upper vehicle can utilize the lower contours of the lower vehicle, normally the area of the engine or the trunk, in such a way that, at this place, one vehicle axle ends up in a lower position than the other vehicle axle. When the upper vehicle is arranged in such a way that its high contours are at this place, the total height of the two vehicles above each other can be minimized. In order for the device to be loaded, the upper pallet can be lifted off of the device, for instance, by an industrial floor truck. One vehicle can be driven onto the lower pallet. The second vehicle can be driven onto the upper pallet that is lying flat on the floor. After the vehicle has been secured, an industrial floor truck, for instance, can lift the upper pallet, together with the vehicle located on it, onto the device to which the upper pallet is then joined. In order to arrange the upper pallet at an angle relative to the lower pallet, an industrial floor truck equipped with a load-carrying mechanism that can pivot around its longitudinal axis can be employed to lift the upper pallet at an appropriate angle onto the individually height-adjusted booms. If such an industrial floor truck is not available, in a first step, the upper pallet can be placed horizontally onto the booms. In a second step, the industrial floor truck can lift the upper pallet at one end, the height of the appropriate lifting rods on this side can be adjusted, and subsequently the upper pallet that has been lifted on one side can be lowered onto the height-adjusted lifting rods. After bolts have been inserted and secured, the upper pallet is connected to the rest of the device.

At one end of the device, there is a support element on which the device can be moved in the lengthwise direction, at least if it has been slightly lifted at the opposite end. In this manner, the device can be moved into and back out of a housing having a limited height. Such housings can be transportation such as, sea freight containers, the cargo area of trucks or else the cargo hold of airplanes. In one embodiment, the height limit is 3 meters.

In one embodiment, the upper pallet can be detached from the booms. The booms are detachably joined to the lower pallet. Alternatively, the booms may be attached to the lower pallet by hinges, so that they can be laid flat onto the lower pallet. The upper pallet can be laid flat onto the booms that have been laid onto the lower pallet, so that the device can be collapsed so as to be flat for empty transportation. In this manner, several collapsed devices stacked on each other can be transported in a space-saving manner, for example, in a sea freight container or in the cargo hold of an airplane.

The device can also be used for the transportation of cargo other than vehicles. It is likewise possible to employ the device for the combined transportation of vehicles and other cargo.

Other advantages, special features and practical configurations ensue from the subordinate claims and from the presentation below of embodiments of the figures.

BRIEF DESCRIPTION OF THE DRAWINGS

FIG. 1 shows a side view of the device (1), whereby the upper pallet (200) is arranged at the maximum height above the lower pallet (100). There are four booms (300), two of which are visible in this view, each consisting of an adjustment unit (310) and a lifting rod (350). The lifting rod (350) consists of a tubular part (351) and a fork-like part (355), whereby the fork-like part (355) is arranged at one end of the lifting rod (350). The tubular part (351) of the lifting rod (350) has through openings (352) distributed in a grid pattern in the radial direction. The adjustment unit (310) consists of two legs (311) arranged at an angle relative to each other. At the first end, the legs (311) stand on the lower pallet (100) while, at the second end, the legs are connected to each other by a yoke (315). The yoke (315) has a tubular section (316) to receive the lifting rod (350). Two through openings (317) pass through this tubular section (316) in the radial direction at the same distance as the grid pattern of the through openings (352) through the lifting rod (350). The diameter of the through openings (317, 352) is almost the same, so that bolts (400) can be pushed through both through openings (317, 352) when they are flush with each other.

Figure 1:
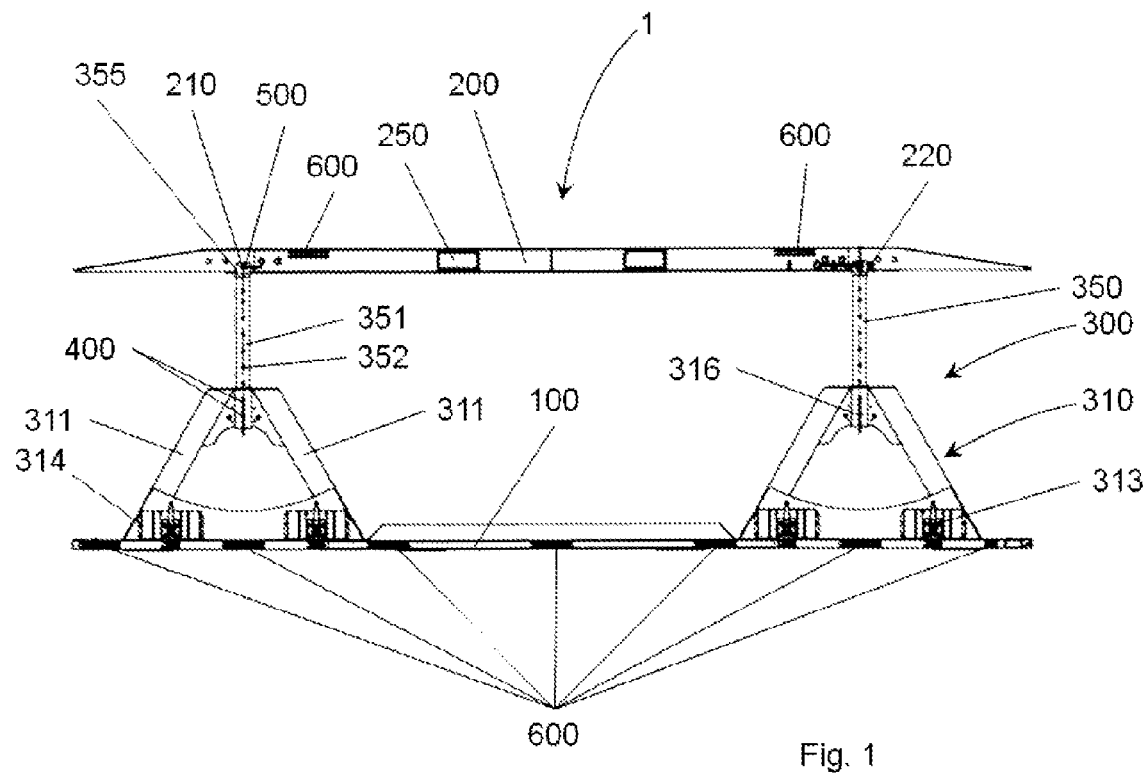
FIG. 1 is a side view of the device with an upper pallet arranged at the maximum height.

The lifting rod, in turn, is joined to the upper pallet (200) by a bolt (500) that can be inserted through a through hole (356) through the fork-like part (355) of the lifting rod (350) or through a corresponding through hole (210) or through a slot (220) in the upper pallet (200) when the through holes (356, 210) are flush with each other.

Due to the fact that several through holes (352) are distributed in a grid pattern over the height of the lifting rod (350), the upper pallet can be fastened at various heights above the lower pallet (100). In order to compensate for the change in the extended length of the upper pallet when it is arranged at an angle, the first end (110) of the upper pallet has a concentric hole to receive the bolt (210) with which the lifting rod (350) is connected to the upper pallet (200), while a slot (220) is provided at the second end (120) for this purpose. Instead of the through hole (210), it is also possible to provide a blind hole. The blind hole can have a geometrical shape in which the bolt (500) can be secured, for example, by turning it, if it has a matching geometrical shape.

Fastening profiles (600) to which cargo can be fastened are provided on the lower pallet (100) as well as on the upper pallet (200).

Figure 2:
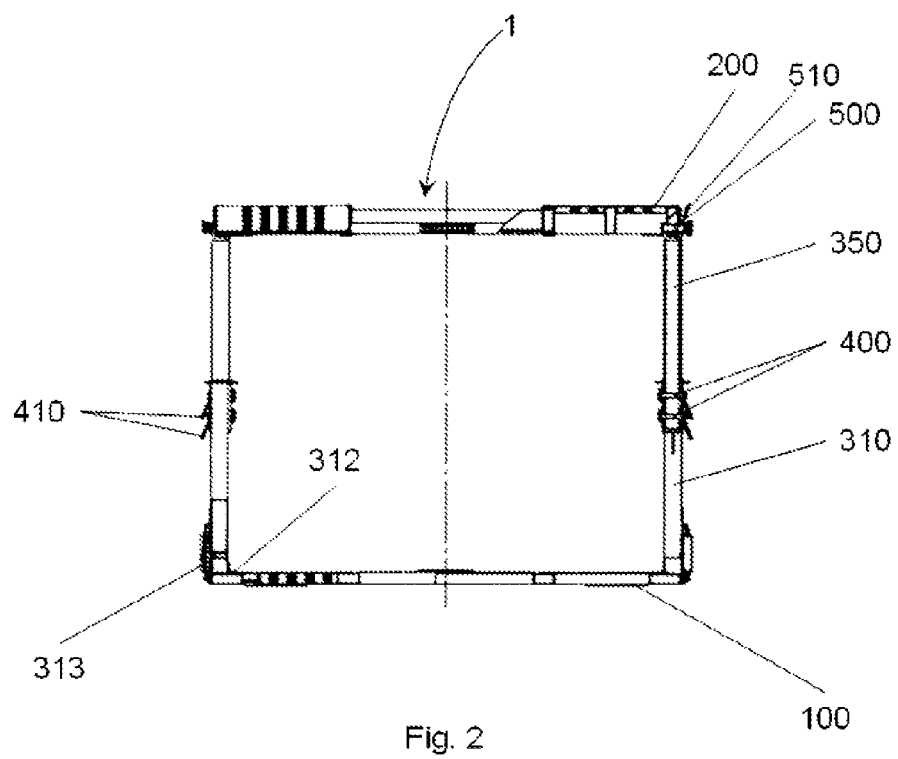
FIG. 2 is a view of the device from one end.

FIG. 2 shows a view of an end (110, 120) of the device (1) in which the upper pallet (200) is fastened at the maximum height above the lower pallet (100). The bolts (400, 500) are secured by steel cables (410, 510) against falling out. The adjustment units (310) are fastened with hinges (312) to the lower pallet (100) so that they are collapsible. In the upright state, when the boom (300) is at an angle of approximately 90° relative to the lower pallet (100) as seen in the axial direction of the device (1), the boom (300) is tightened to the lower pallet (100) by a tightening element (313) located on the outside of the boom (300) in such a way that it can not pivot inwards. Due to the arrangement of the hinges (313) on the inside of the boom (300) located opposite from the tightening element (313), the boom (300) likewise cannot pivot outwards to any considerable degree beyond the perpendicular position vis-à-vis the lower pallet (100). Protection elements (314) that are fastened to the boom (300) are provided for purposes of protecting the tightening elements (313).

Figure 3:
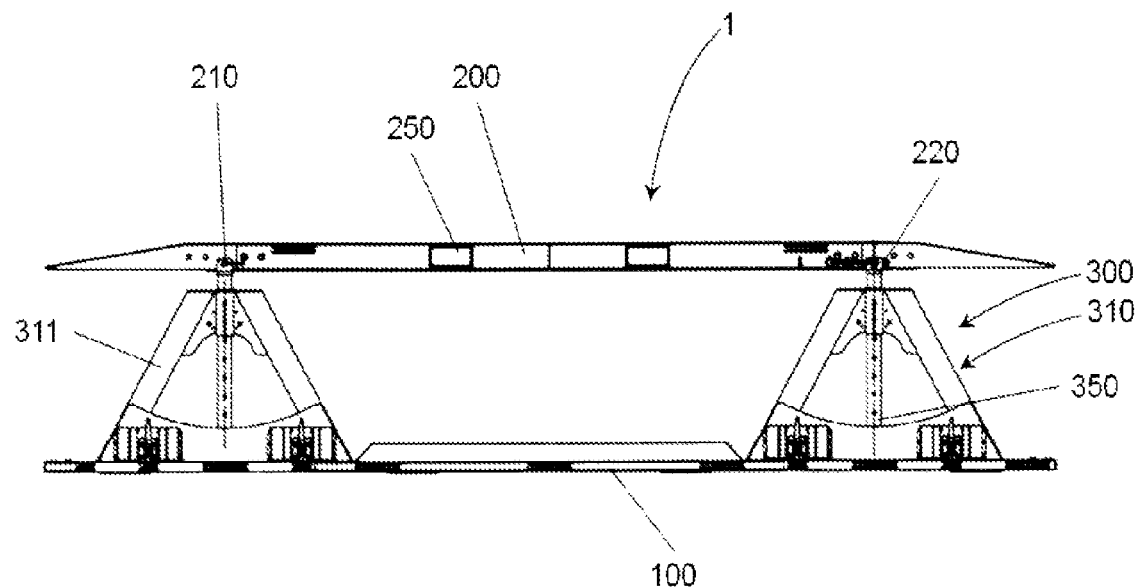
FIG. 3 is a side view of the device with an upper pallet arranged at the minimum height.

FIG. 3 shows a side view of the device (1), whereby the upper pallet (200) is arranged at the minimum height above the lower pallet (100). Each lifting rod (350) has passed as far as possible through the tubular section (316) of the appertaining yoke (315).

Figure 4:
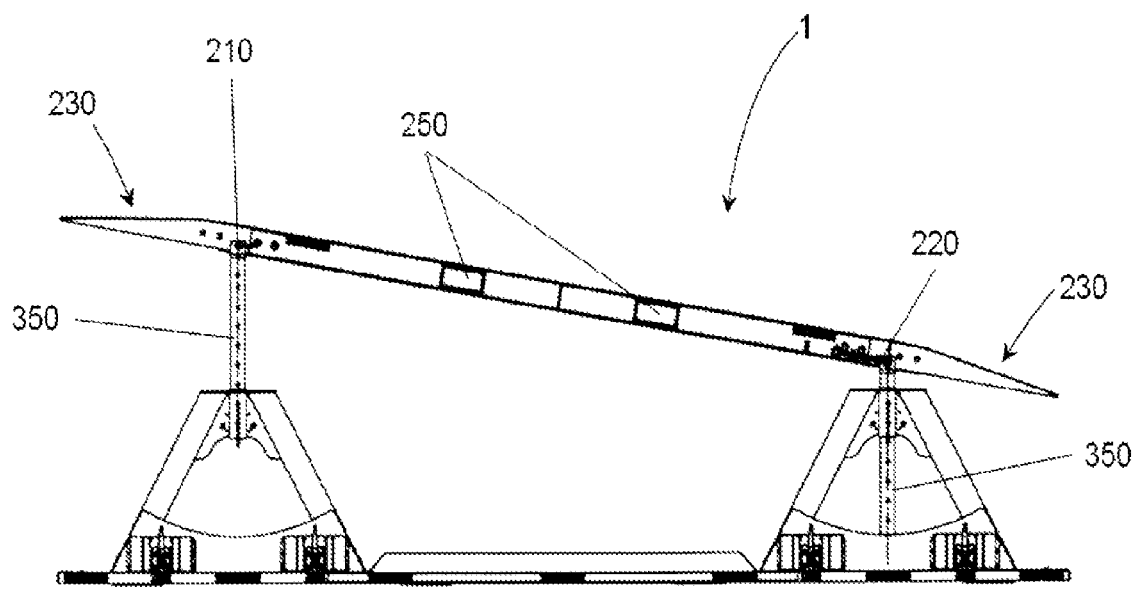
FIG. 4 is a side view of the device with a maximally tilted upper pallet.

FIG. 4 shows a side view of the device (1) with a maximally tilted upper pallet (200). Due to the tilting of the upper pallet (200), the distance between the points of attack (210, 220) of the bolts changes during the handling procedure. For this reason, one side of the upper pallet (200) has a through hole (210) for the bolt (500), whereas it has a slot (220) on the other side, so that, in spite of the tilting of the upper pallet (200), bolts (500) can be inserted on both sides and the connection between the upper pallet (200) and the lifting rod (500) can be established. Two fork entries (250) are provided in the lengthwise sides of the upper pallet (200). The tines of a forklift can be inserted into these fork entries in order to lift the device (1). The arrangement of the fork entries (250) in the upper pallet (200) presupposes that the upper pallet (200) can be lifted off of the device (1). As a result, vehicles can be loaded very easily onto the upper pallet (200), since it can be laid flat on the ground. For this purpose, the upper pallet (200) has an appropriate drive-on ramp (230) at least at one end. After the upper pallet (200) has been placed onto and joined to the booms (300), which in turn, are connected to the lower pallet (100), the entire device (1) can be lifted and transported in that the upper pallet (200) is lifted, for example, by an industrial floor truck.

Figure 5:
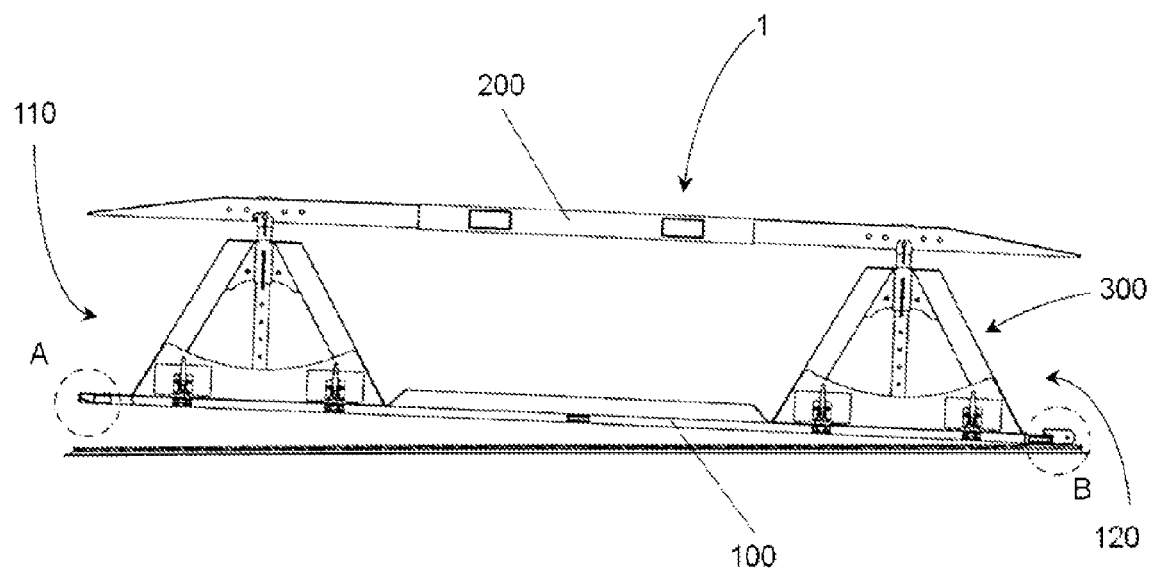
FIG. 5 is a side view of the device lifted at one end in order to be moved.

FIG. 5 shows a side view of the device (1), whereby a first end (110) of the device (1) has been lifted slightly so that the entire device (1) can be moved in the lengthwise direction on the support element (150) (see partial enlargement in FIG. 7) that is provided at the second end (120). When the first end (110) is lifted, the support element (150) comes into contact with the ground. In the embodiment shown, the first end (110) is lifted so that the device (1) is at an angle of about 2.5° relative to the ground. The support element (150) consists of a roller that is attached to the lower pallet (100) in such a way that it can rotate around itself with its outer circumference approximately 1 mm above the ground when the lower pallet (100) is resting on it flat on the ground. Other combinations of the arrangement of the support element (150) and of the lifting height are also possible.

Figure 6:
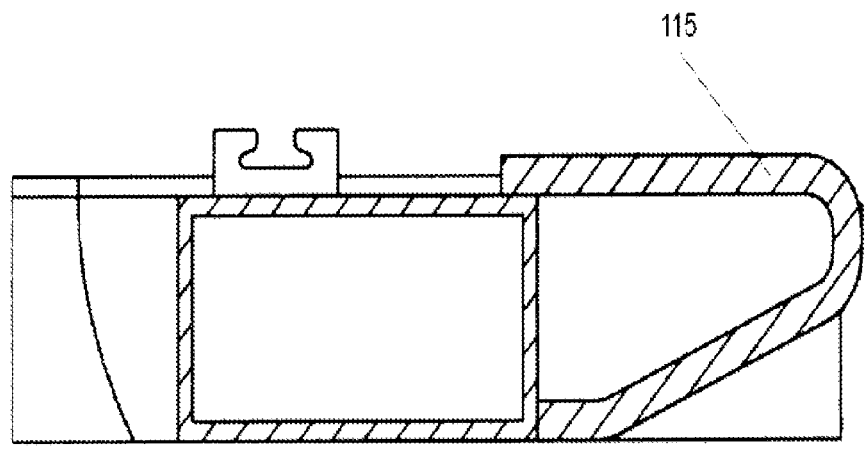
FIG. 6 is a deflector for fork tines A from FIG. 5.

FIG. 6 depicts a partial enlargement of detail "A" in FIG. 5. For purposes of conveniently lifting the first end (110), a fork tine deflector (115) is arranged at the end of the lower pallet (100) at this end (110). This fork tine deflector (115) consists of a profile whose underside ascends towards the outside. If the tines of an industrial floor truck such as, for instance, a forklift truck are inserted underneath this ascending underside, the device (1) is lifted to such an extent that the tine of the industrial floor truck can be pushed under the device (1). Now the tine and thus the device (1) can be lifted at the first end (110) to such an extent that the support element (150) at the second end (120) comes into contact with the ground, as a result of which the industrial floor truck can move the device (1) on this support element (150).

Figure 7:
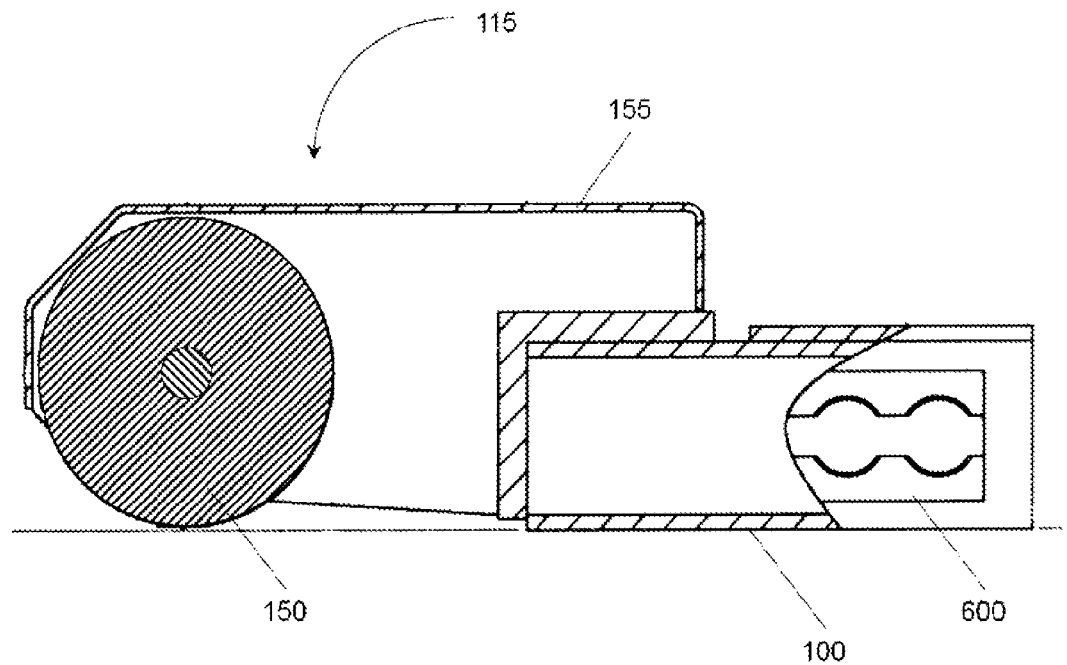
FIG. 7 is a support element B from FIG. 5.

FIG. 7 depicts a partial enlargement of detail "B" from FIG. 5. In this embodiment, the support element (150) is made up of a roller that is installed at the second end (120) of the lower pallet (100) in such a way that its outer circumference hovers about 1 mm above the ground when the device (1) is standing flat on the ground. As a result, the device (1) rests safely and secured against slipping when it is not lifted at one side. Only when the lower pallet (100) is lifted at one side on the opposite first end (110) does the roller (150) come into contact with the ground. Above the roller (150), there is a protection element (155) that prevents objects from falling from above between the roller (150) and the lower pallet (100) since this could prevent the roller from rolling. On the other hand, the protection element (155) can also protect the person working on the transportation procedure against injuries.

Moreover, FIG. 7 shows a fastening profile (600) for fastening cargo. This refers to a system rail known from the airfreight sector. However, other fastening profiles (600) with different shapes are likewise possible.

Figure 8:
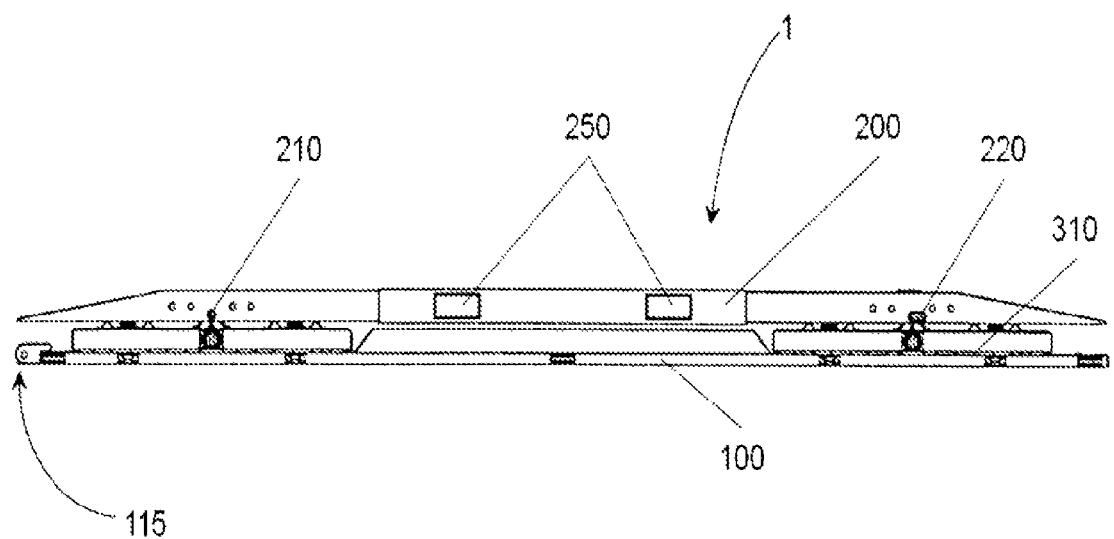
FIG. 8 is a side view of the device collapsed flat.

FIG. 8 depicts a side view of the device (1) when collapsed flat. The upper pallet (200) is lifted off of the booms (300), the lifting rod (350) is moved into the tubular sections (316) of the yoke (315), and the tightening elements (313) are released. The booms (300) are collapsed flat onto the lower pallet (100) and the upper pallet (200) is laid flat onto the booms (300) which, are also lying flat. The package thus created can be bound together using ratchet straps. However, connection possibilities employing bolts or clamps that extend through the upper pallet (200) and the lower pallet (100) or which can be pushed on from the outside over the upper pallet (200) and the lower pallet (100) are also possible. If the lower pallet (100) and the upper pallet (200) have drive-on plates that are not joined to each other as driving tracks, one embodiment may include connection options involving clamps that can be pushed from the inside over the lower pallet (100) and the upper pallet (200). Other possibilities are clamps that can be inserted into cutouts in the upper pallet (200) and/or in the lower pallet (100). The connection of the upper pallet (200) to the lower pallet (100) makes it possible to lift and transport the device (1) by lifting the upper pallet (200), for example, with an industrial floor truck that accesses the fork entries (250). It is possible to stack several devices (1) above each other in order to transport several empty devices (1) on the footprint of one device (1).

Figure 9:
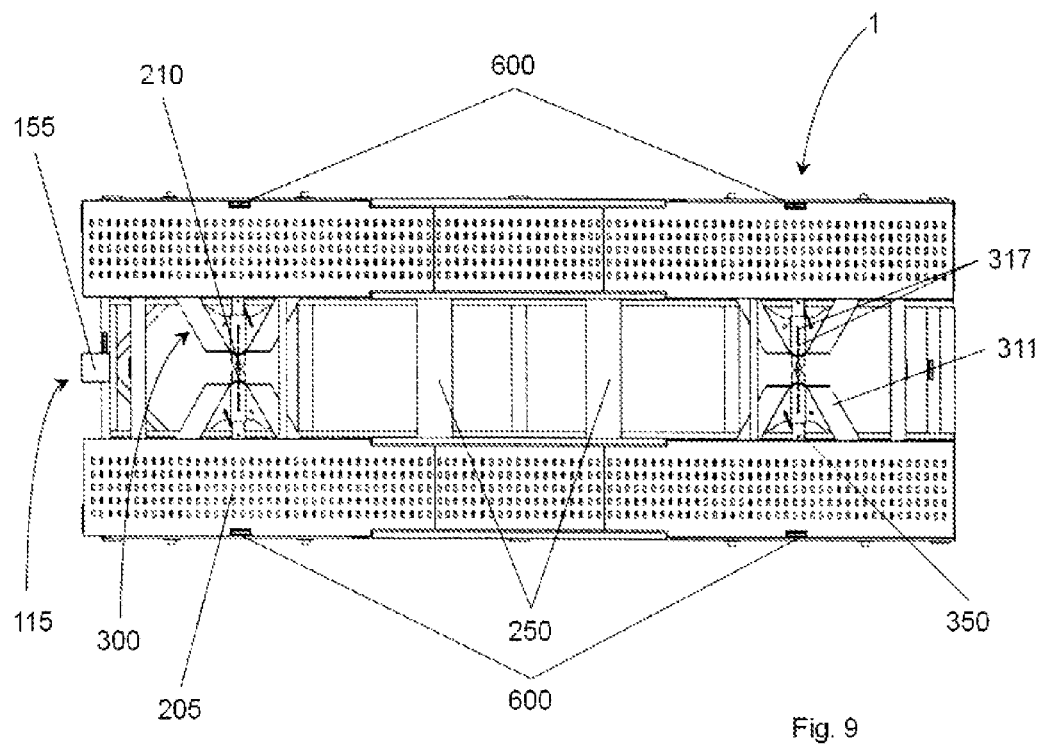
FIG. 9 is a top view of the device collapsed flat.

FIG. 9 shows a top view of the device (1) when collapsed flat. The upper pallet (200) as well as the lower pallet (100) have drive-on plates (205) as driving tracks. For weight-saving reasons, these drive-on plates are arranged in the area where there might be wheels of the vehicles that are to be transported. The drive-on plates (205) consist of perforated plates. The booms (300) are collapsed flat onto the lower pallet (100), whereby the lifting rods (350) are inserted into the tubular sections (316) of the yokes (315). The fork entries (250) in the form of a box profile extend over the width of the device (1).

Figure 10:
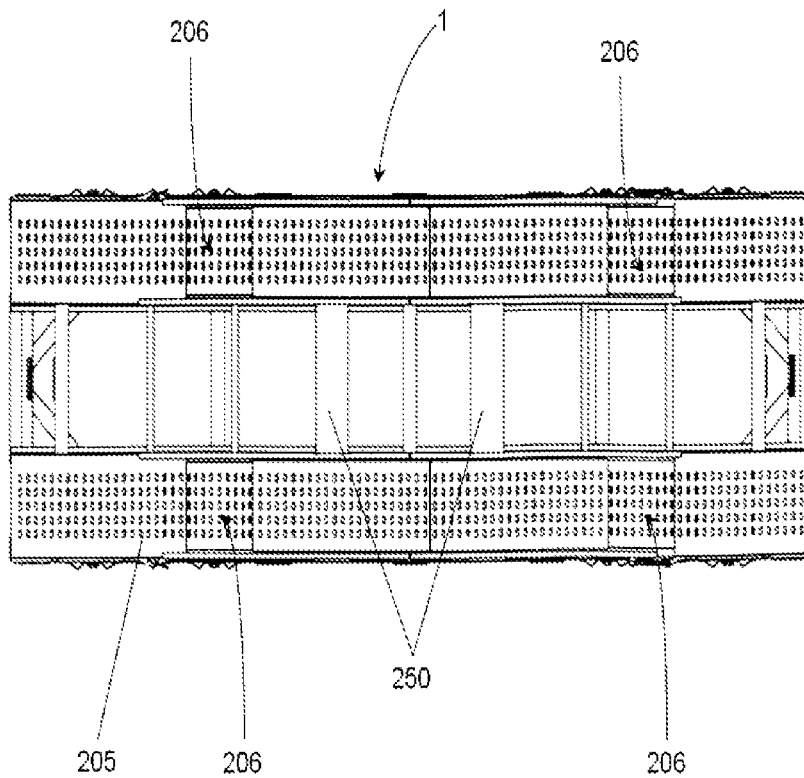

FIG. 10 shows a top view of the upright device (1). In this embodiment, there are wells (206) into which the wheels of certain vehicles come to rest. This further minimizes the total height of the loaded device.

For weight-saving reasons, the device can be made of aluminum or an aluminum alloy. Lugs can be provided on the device for purposes of affixing the device in the specific transporter.

What is claimed is:

1. A device for the transportation of at least two vehicles one above the other, whereby the device contains a lower pallet and an upper pallet, wherein the upper pallet is connected to the lower pallet by individually height-adjustable booms that consist of an adjustment unit and a lifting rod, whereby the lifting rod can be fastened to the adjustment unit at different heights, and in such a way that the upper pallet can be tilted relative to the lower pallet in a longitudinal direction, whereby the upper pallet can be detached from the individually height-adjustable booms, and the individually height-adjustable booms can be collapsed so as to be flat onto the lower pallet, whereby the upper pallet can be laid flat onto the collapsed individually height-adjustable booms, whereby the individually height-adjustable booms can be collapsed perpendicular to lengthwise direction of the lower pallet and whereby there is also a fork entry for a load pick-up element of an industrial floor truck arranged in the upper pallet.

2. The device according to claim 1, wherein the upper pallet has a through hole on the first side and a slot on the second side, each in order to receive a bolt with which the upper pallet is fastened to the individually height-adjustable booms.

3. The device according claim 2, wherein the lower pallet and the upper pallet have a drive-on means consisting of a perforated plate, for a vehicle.

4. The device according to claim 3, wherein the upper pallet is fastened to the lifting rod by means of a bolt.

5. The device according to claim 4, wherein the lifting rod is fastened to the adjustment unit by means of a bolt.

6. The device according to claim 5, wherein the adjustment unit is pivotably fastened to the lower pallet by means of a hinge.

7. The device according to claim 6, wherein the adjustment unit can be secured by means of a tightening element to the lower pallet in such a way that the adjustment unit can be affixed in an essentially perpendicular position relative to the lower pallet.

8. The device according to claim 7, wherein a fork tine deflector is provided at a first end of the lower pallet, and a support element is arranged at a second end of the lower pallet in such a way that, by lifting the first end, the device can be moved in the lengthwise direction into a housing having a limited height.

9. The device according to claim 8, wherein the support element is configured so that it can rotate around itself.

10. The device according to claim 9, wherein means for securing cargo are provided on the lower pallet and/or on the upper pallet.

11. The device according to claim 10, wherein the device is made of an aluminum alloy.

12. A transportation means, comprising a device for the transportation of at least two vehicles one above the other, whereby the device contains a lower pallet and an upper pallet, wherein the upper pallet is connected to the lower pallet by individually height-adjustable booms that consist of an adjustment unit and a lifting rod, whereby the lifting rod can be fastened to the adjustment unit at different heights, and in such a way that the upper pallet can be tilted relative to the lower pallet in a longitudinal direction, whereby the upper pallet can be detached from the individually height-adjustable booms, and the individually height-adjustable booms can be collapsed so as to be flat onto the lower pallet, whereby the upper pallet can be laid flat onto the collapsed individually height-adjustable booms, whereby the individually height-adjustable booms can be collapsed perpendicular to lengthwise direction of the lower pallet and whereby there is also a fork entry for a load pick-up element of an industrial floor truck arranged in the upper pallet, wherein the upper pallet has a through hole on the first side and a slot on the second side, each in order to receive a bolt with which the upper pallet is fastened to the individually height-adjustable booms, and wherein the lower pallet and the upper pallet have a drive-on means consisting of a perforated plate, for a vehicle, and wherein the upper pallet is fastened to the lifting rod by means of a bolt, and wherein the lifting rod is fastened to the adjustment unit by means of a bolt.

* * * * *